(12) United States Patent
Dellow

(10) Patent No.: US 7,356,708 B2
(45) Date of Patent: Apr. 8, 2008

(54) DECRYPTION SEMICONDUCTOR CIRCUIT

(75) Inventor: Andrew Dellow, Bristol (GB)

(73) Assignee: STMicroelectronics Limited, Bristol (GB)

( * ) Notice: Subject to any disclaimer, the term of this patent is extended or adjusted under 35 U.S.C. 154(b) by 662 days.

(21) Appl. No.: 10/773,089

(22) Filed: Feb. 3, 2004

(65) Prior Publication Data

US 2004/0223618 A1  Nov. 11, 2004

(30) Foreign Application Priority Data

Feb. 4, 2003  (EP) .................................. 03250714

(51) Int. Cl.
*H04L 9/00* (2006.01)
*H03K 19/00* (2006.01)
*H04N 7/00* (2006.01)
*G06F 15/00* (2006.01)

(52) U.S. Cl. .................. 713/189; 713/153; 380/277; 326/8; 725/31; 725/87; 725/104; 709/238; 709/239; 709/240

(58) Field of Classification Search ............... 380/277; 713/189, 153; 364/200; 326/8; 257/7; 725/31, 725/87, 104; 709/238–240
See application file for complete search history.

(56) References Cited

U.S. PATENT DOCUMENTS

| | | | | | |
|---|---|---|---|---|---|
| 4,155,118 | A | * | 5/1979 | Lamiaux | ..................... 711/215 |
| 4,423,287 | A | * | 12/1983 | Zeidler | ........................ 705/71 |
| 5,093,819 | A | * | 3/1992 | Kimura | ................... 369/30.12 |
| 5,313,590 | A | * | 5/1994 | Taylor | ........................ 710/317 |
| 5,416,916 | A | * | 5/1995 | Bayle | .......................... 710/22 |
| 5,432,949 | A | * | 7/1995 | Baba | ........................... 712/39 |
| 5,559,877 | A | * | 9/1996 | Ash et al. | ............... 379/201.05 |
| 5,650,951 | A | * | 7/1997 | Staver | ........................ 708/313 |
| 6,041,035 | A | | 3/2000 | Thedens | ..................... 370/217 |
| 6,209,099 | B1 | * | 3/2001 | Saunders | ..................... 726/22 |
| 6,301,696 | B1 | * | 10/2001 | Lien et al. | .................... 716/16 |
| 6,356,108 | B2 | * | 3/2002 | Rangasayee | ................. 326/40 |
| 6,408,074 | B1 | | 6/2002 | Loughran | ..................... 380/28 |
| 2003/0007636 | A1 | * | 1/2003 | Alves et al. | ................... 380/37 |
| 2003/0159062 | A1 | * | 8/2003 | Tozawa et al. | ............. 713/200 |
| 2003/0223580 | A1 | * | 12/2003 | Snell | ........................... 380/28 |

FOREIGN PATENT DOCUMENTS

WO  WO0059222  * 10/2000
WO  WO 03/001398 A1  1/2003

* cited by examiner

*Primary Examiner*—MinhDieu Nguyen
(74) *Attorney, Agent, or Firm*—Lisa K. Jorgenson; E. Russell Tarleton; Seed IP Law Group PLLC

(57) ABSTRACT

A semiconductor integrated circuit having a plurality of selectable pathways inter-connected to data sources and data destinations; a cryptographic circuit connected to the selectable pathways to selectively receive data from at least one of the data sources, to decrypt or encrypt the data in accordance with a key, and to selectively provide the encrypted or decrypted data to at least one of the data destinations; an instruction interpreter arranged to receive an instruction signal and to generate an output to control the plurality of selectable pathways to select from which of the data sources the cryptographic circuit receives data and to which destination the cryptographic circuit provides data. The instruction interpreter configured such that the instruction signal defines a data pathway that operates in accordance with a rule that limits the data pathway configurations which are selectable.

29 Claims, 3 Drawing Sheets

DECRYPTION SEMICONDUCTOR CIRCUIT

BACKGROUND OF THE INVENTION

1. Field of the Invention

This invention relates to apparatus for securely selecting data pathways in an encryption or decryption system, and in particular to securely routing encryption or decryption keys in a pay-television system.

2. Description of the Related Art

The use of encryption techniques in subscriber-based systems is essential to prevent unauthorized access to broadcasts by parties who are not entitled to access them. For example, a person may wish to gain access to a sports broadcast service without making the appropriate payment to the broadcast service provider.

Many encryption techniques make use of secret electronic keys to encrypt broadcast data so that the data can only be comprehended when decrypted using a specified key possessed by a subscriber. In a typical system, various keys are provided for different encryption operations which need to be securely routed along with other data to or from various internal memories or other external sources or destinations.

We have appreciated that it is important to ensure that encryption or decryption keys and other confidential data are not intercepted otherwise the security of the system may be jeopardised. In prior software-based systems, processors running computer programs are used to control data routing. Such systems are vulnerable to hacking when computer code is modified causing sensitive data to be routed to insecure data destinations where the hacker is able to obtain it. We have also appreciated the need for a means to securely control the routing of encryption keys.

BRIEF SUMMARY OF THE INVENTION

The invention is defined in the independent claims to which reference may now be made. Advantageous features of the invention are set forth in the dependant claims.

A system embodying the invention is a semiconductor integrated circuit having a plurality of encryption or decryption key stores, a plurality of data sources and destinations, and a cryptographic circuit. The key stores, data sources and destinations, and the cryptographic circuit are inter-connected by a network of selectable data pathways to allow data to be routed from specific sources to specific destinations. In particular, encrypted or decrypted data is routed from one of the data sources to the cryptographic circuit, an encryption or decryption key is routed from one of the key stores to the cryptographic circuit, and decrypted or encrypted data is routed from the cryptographic circuit to one of the data destinations or key stores. The data pathways may be securely selected according to one or more pre-defined rules.

The data pathways are selected by setting the switching states of a plurality of routing components that mutually connect the plurality of data pathways and route data between selected pathways according to their switching states. The switching states of the routing components are controlled by the output of an instruction interpreter that receives two input signals and combines them to generate the output control signal. The first input is for a signal representative of an instruction to select a data pathway appropriate for a particular encryption or decryption operation. The second input is for a signal representative of a rule that defines those pathway configurations that are valid for a particular mode of operation of the system. In one embodiment the two inputs are bit fields that are combined by a logic circuit to produce an output bit field. The logic circuit includes a series of combinatorial components arranged so as to correctly interpret the instruction input according to the rule input. The output signal sets the routing components to the appropriate switching states only if the instruction is valid as determined by the rule signal.

In one embodiment the second input signal is generated by a rule selector. The rule selector comprises a series of anti-fuses or one-time-only switches that generates a bit field as an output. The series of anti-fuses are set to the appropriate state to generate a selected bit field output, and once set, remain in that state indefinitely. Each bit field combination corresponds to a different rule selection scheme that defines the allow ability of each pathway configuration. By setting the anti-fuses, a generic rule selector with many possible rule schemes may be tailored to a specific application, depending on the particular rule set required for that application.

The instruction interpreter, rule selector, cryptographic circuit, and data pathways are all formed on a single monolithic semiconductor integrated circuit to prevent unauthorized modification of the system and to increase security.

In accordance with another embodiment of the invention, a method for encrypting and decrypting data is provided. The method includes generating an instruction signal containing an instruction portion and a data portion; receiving data at a cryptographic circuit from one of the plurality of data sources on a data pathway selected in response to the instruction signal; performing one of encryption and decryption on the data in response to the instruction signal; and thereafter providing the encrypted/decrypted data to one of a plurality of data destinations on a data pathway selected in response to the instruction signal.

In accordance with another method of the present invention, data is encrypted and decrypted in accordance with the following steps: configuring one or more of a plurality of anti-fuses within a rule selector circuit, the rule selector circuit configured to select routing rules according to a rule selection scheme, the rule selection scheme depending upon the configuration of the encryption/decryption circuits; generating an instruction signal in accordance with a routing rule received from the rule selection circuit; receiving data at a cryptographic circuit from one of a plurality of data sources on a data pathway selected in response to the instruction signal; performing one of encryption and decryption on the data in response to the instruction signal; and thereafter providing the encrypted/decrypted data to one of a plurality of data destinations on a data pathway selected in response to the instruction signal.

In accordance with another method of the present invention, data is encrypted and decrypted in accordance with the following steps: storing a plurality of encryption and decryption keys; configuring one or more of a plurality of one-time switches in a rule selection circuit to select one from among a plurality of routing rules according to a rule selection scheme dependent upon a configuration of the encryption/decryption circuit; generating an instruction signal containing an instruction portion and a data portion, the instruction signal configured to select an encryption/decryption key; receiving data at a cryptographic circuit from one of a plurality of data sources on a data pathway selected in response to the instruction signal, including receiving encrypted control words and a service key; performing one of decryption and encryption on the data in response to the instruction signal, including decrypting the service key with a secret key stored in the encryption/decryption circuit in order to decrypt the encrypted control words; and thereafter providing the encrypted/decrypted data to one of a plurality of data destinations on a data pathway selected in response to the instruction signal.

In accordance with yet another embodiment of the invention, a circuit for encrypting and decrypting data in a semiconductor integrated circuit is provided. The circuit includes a plurality of data sources and data destinations coupled via a plurality of data pathways; a rule selection circuit having one-time selectable switches for selecting one from among a plurality of routing rules in accordance with a rule selection scheme; a central processing unit configured to generate an instruction signal for selecting and unselecting data pathways in accordance with a routing rule generated by the rule selector circuit, the instruction signal including instructions for selecting a key from a key store; an instruction interpreter coupled to the rule selector circuit and the central processing unit and configured to receive the routing rule and the instruction signal and generate an output signal; and a cryptographic circuit coupled to the instruction interpreter and selectively coupleable to one or more of the data pathways in response to the output of the instruction interpreter to receive data at an input from at least one of the data sources on a data pathway in response to the instruction signal, to decrypt or encrypt the data in accordance with a key selected in response to the instruction signal, and to thereafter provide encrypted/decrypted data to one of the plurality of data destinations on a data pathway selected in response to the instruction signal.

DETAILED DESCRIPTION OF THE INVENTION

The disclosed embodiment of the present invention relates to delivery of digital content such as music, video, or games, but in particular to pay-television systems in which a subscriber may receive and view television broadcasts in return for payment of a subscription charge. Television broadcasts are received in a scrambled form to prevent unauthorized recipients from viewing the broadcast service. The subscriber may descramble the television broadcast using a decryption key to decrypt encrypted control words used to scramble the broadcast. In the preferred embodiment, different encryption or decryption keys may be used to encrypt or decrypt control words specific to different broadcast services. A subscriber possesses the decryption keys associated with those broadcast services to which he is entitled. When encryption or decryption keys are specific to particular broadcast services, they may be conveniently referred to as service keys or common keys.

To provide a plurality of service keys to subscribers, the service keys are transmitted over air and may be themselves encrypted in accordance with a secret key that is unique to a particular subscriber. This encryption prevents others from intercepting broadcasts and illegitimately obtaining the service keys. The plurality of service keys are transmitted to, and received by the subscriber encrypted in accordance with the secret key. The keys are decrypted and a service key may thereby be acquired. Performing the various operations described above requires controlled routing of various data around the system. Furthermore, since the purpose of the above described operations are to prevent unauthorized access to broadcasts, the routing of the data must be secure to maintain the integrity of the system.

Figure 1:
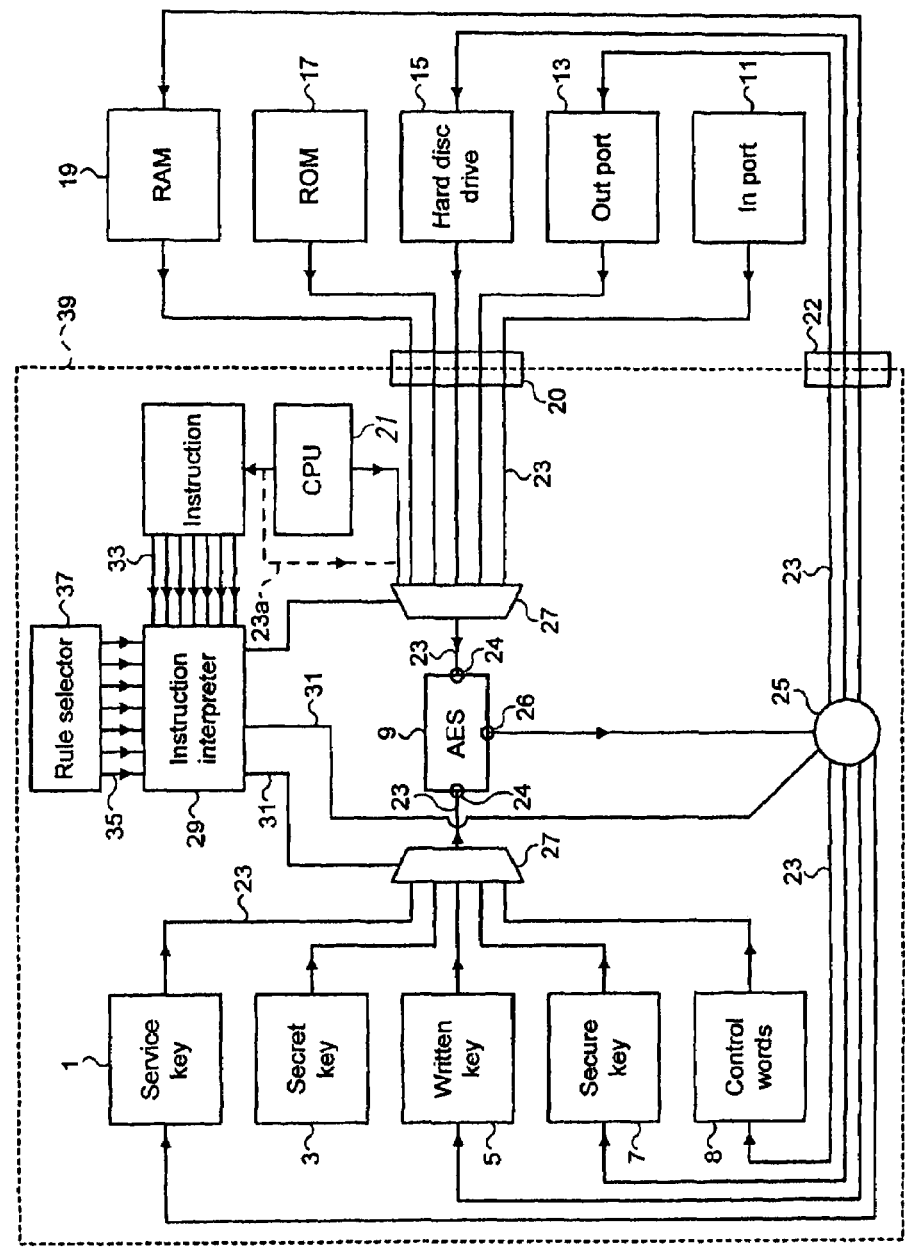
FIG. 1 is a schematic diagram of a semiconductor circuit embodying the invention.

FIG. 1 is a schematic diagram of a semiconductor circuit for use in an encryption or decryption system such as a pay television system in which the invention is employed. The system comprises a plurality of memories or stores 1, 3, 5, 7 that each stores one or more keys, which may be used to encrypt or decrypt digital data, a cryptographic circuit 9, here an AES circuit, to encrypt or decrypt digital data using encryption or decryption keys, and a plurality of data sources and destinations 11, 13, 15, 17, 19 from which data may be received or to which data may be transmitted, either encrypted or decrypted.

The key memories 1, 3, 5, 7 contain encryption or decryption keys that may be used in various encryption or decryption operations. An encryption or decryption key may be in the form of, for example, a 128 bit digital data packet. A first key memory 1 comprises a table containing one or more common or service keys used to decrypt control words used to scramble various broadcast services.

A subscriber gains viewing rights to pay television services by virtue of his possession of the appropriate service keys. A second key memory 3 contains a secret key that is unique to a particular subscriber. This key may be used to encrypt or decrypt service keys and provides a means to prevent persons from obtaining service keys to which they are not entitled. A third key memory 5 includes a table containing one or more written keys generated by a processor running a software algorithm. These keys may be used where large numbers of unique keys are required, for example in frequent memory-to-memory transfers. A forth key memory 7 includes a table containing one or more secure keys, which may be derived from either the secret key or a written key by performing a transform algorithm, or combining with other keys or data. A further memory 8 comprises a table containing a plurality of control words used to scramble or descramble television broadcast data. The integrity of the system relies on the confidentiality of these keys and data, so it is essential that they are not routed to destinations where they become available to hackers. It is therefore also essential that hackers are prevented from modifying the system to allow unauthorized re-routing of data.

The data sources and destinations 11, 13, 15, 17, 19 provide encrypted or scrambled data to the system and may be used to store decrypted or descrambled data. A data-in port 11 receives scrambled broadcast television signals, encrypted control words used to descramble the television signals, and encrypted keys used to decrypt the control words. A data-out port 13 transmits descrambled television signals from the system to a video display unit. A hard disc drive 15 may be provided to act as a buffer or video recorder to store scrambled or descrambled broadcast data. The hard disc drive 15 may also be used to store data corresponding to a particular subscriber such as personal details, credit data, viewing rights and subscriber selected settings. A read only memory (ROM) 17 is provided to store an operating system, error correction algorithms, system checking routines, encryption key generating algorithms and any other programs required for operation of the system. A random access memory (RAM) 19 is provided as a temporary data store during operation of the system.

A central processing unit (CPU) 21 is provided to control the system including controlling the flow of data around the system, and to execute programs stored on the ROM 17. For example, the CPU 21 may generate written keys using an algorithm stored on the ROM 17. Additionally, the key memories may also be regarded as data sources or destinations. The ROM 17 and data-in port 11 are data sources only, the data-out port 13 is a data destination only, and the hard drive 15 and RAM 19 are both data sources and destinations. Data sources and destinations external to the circuit 39 may interface with the circuit 39 via input and output interfaces 20, 22. Some data sources and destinations are less secure than others. For example, a hacker has easy access to data ports while internal key memories are more secure. Therefore, it is essential that confidential data such as decrypted keys are not illegally routed to vulnerable sources. For example, a hacker may attempt to circumvent the security of the system by re-routing the secret key to the out port.

The cryptographic circuit 9 includes a circuit having inputs 24 and an output 26 arranged to encrypt or decrypt data using an encryption or decryption key retrieved from one of the key memories. The cryptographic circuit 9 receives as an input data, either in an encrypted or unencrypted form, from one or more of the data sources, an encryption or decryption key from one of the key memories, and encrypts or decrypts the data according to a specified algorithm. The data may be encrypted or decrypted by any appropriate encryption algorithm such as the Advanced Encryption Standard (AES) algorithm or any other symmetric cryptographic transform. The purpose of encrypting data is so that unauthorized persons cannot gain access to the data. It is important therefore to maintain the security of the system so that keys are not acquired by persons not entitled to them to illegitimately decrypt broadcast signals. Encrypted or decrypted data is output from the cryptographic circuit 9 and may be sent to one or more data destination such as a display unit via the data-out port 13 or the hard disc 15.

The key memories, cryptographic circuit 9 and data sources and destinations are inter-connected by a network of selectable communication links or data pathways 23. The configuration of the data pathways 23 are determined by a plurality of routing and selection components such as switches 25 and multiplexers (MUXs) 27. A switch 25 may be set so that one input pathway is selectively connected to one of a plurality of output pathways according to the setting of the switch 25. A MUX 27 may be set so that one of a plurality of input pathways is selected as an output pathway according to the setting of the MUX 27. Data flows around the system along the pathways 23, and is selectively routed according to the switching states of the routing components connecting the pathways 23. For example, scrambled television signals may be selectively routed from the data-in port 13 to the cryptographic circuit 9, control words may be selectively routed from the control word memory 8 to the cryptographic circuit 9, and the resulting descrambled television data may be selectively routed from the cryptographic circuit 9 to the out port 13.

The routing components are controlled by an instruction interpreter 29 that outputs a plurality of control signals 31, each one representative of a switching state and which controls one of the plurality of routing components. In one embodiment, the selection between the plurality of data sources and destinations may be made directly by a MUX. Alternatively, a direct memory access (DMA) processor may be provided to deal with complex memory operations involving transfers of large blocks of data. In this case, the data sources and destinations interface via a data bus with the DMA. The DMA receives signals from the instruction interpreter 29 and CPU 21 to select between various data sources and destinations and to transfer data to or from them. The DMA then provides the data to the cryptographic circuit 9. The instruction interpreter 29 allows the DMA to define a memory address and block size for a data transfer rather than having to transfer each data word at a time, thereby improving data transfer efficiency. The instruction interpreter 29 receives two inputs that are combined to produce the output control signals 31 to control the switching states of the routing components.

Figure 2:
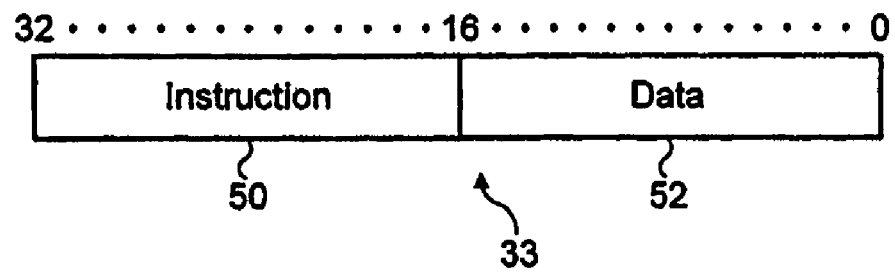
FIG. 2 is a schematic diagram of an instruction signal.

The first input 33 of the instruction interpreter 29 includes a signal representative of an instruction defining a data pathway configuration of the system. The first input, or instruction signal 33 is generated by the CPU 21 and transmitted to the instruction interpreter 29 when an encryption or decryption operation is required. FIG. 2 is a schematic diagram of an instruction signal. In the preferred embodiment, the instruction signal 33 is a 32-bit data field composed of two 16-bit portions. The first portion 50 contains an instruction corresponding to a particular data pathway configuration of the system. For example, one instruction may correspond to a pathway configuration in which a broadcast encrypted service key and the secret key are routed to the cryptographic circuit 9, and the decrypted service key is routed to the service key memory 1. Each bit of the first portion, or instruction portion 50, may correspond directly to the switching state of a particular routing component. Preferably, the instruction is in the form of an abstract code that is representative of a pathway configuration according to a predetermined scheme.

The second portion 52 may contain further data necessary to fully define the instruction. For example, if the instruction portion 50 corresponds to retrieving a block of data from a memory, the second portion, or data portion 52, contains the start and end memory addresses of the data. Alternatively, the data portion 52 may contain data instructing the instruction interpreter 29 to expect receipt of further related instructions, for example from the CPU 21 or the DMA processor. In this way, multi-word length instructions may be provided for. If an instruction 33 corresponds to an operation requiring a software written key, the data portion 52 may contain the key data generated by the CPU 21. In this case the instruction portion 50 is input into the instruction interpreter 29 by the CPU 21 while the data portion 52 is separated and input via an alternative data pathway, 23a of FIG. 1, into the cryptographic circuit 9. In this way, the written key is used immediately rather than having to be stored in the key memory 5 first.

The second input 35 to the instruction interpreter 29 includes a signal representative of a rule which defines those pathway configurations that are valid for a particular mode of operation of the system. For example, if encrypted data is received from a particular destination, the secret key only may be used to decrypt the data. The second input, or rule signal 35 is generated and output from a rule selector 37 and transmitted as an input to the instruction interpreter 29. The rule signal 35 comprises a bit field and is generated by a series of anti-fuses in the rule selector 37.

Figure 3:
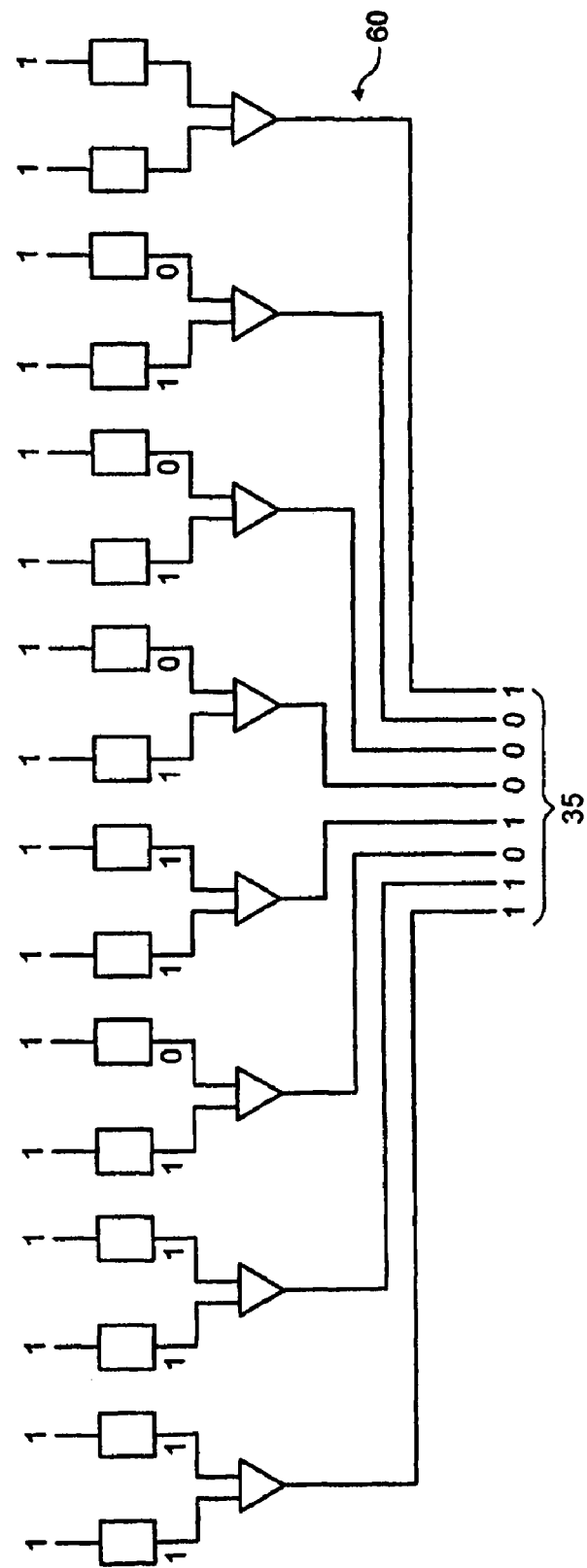
FIG. 3 is a schematic diagram of a series of anti-fuses in the rule selector shown in FIG. 1.

FIG. 3 is a schematic diagram of a series of anti-fuses in the rule selector shown in FIG. 1. An anti-fuse 60 is a component that generates an electrical signal of 0 or 1 units depending on how the anti-fuse 60 is configured, and once configured initially, the anti-fuse 60 remains in that state indefinitely. In this way a permanent, selectable bit field may be generated. Such anti-fuses are known to those skilled in the art. Alternatively, the rule signal 35 may be generated by a non volatile or write-once memory or software writer.

Figure 4:
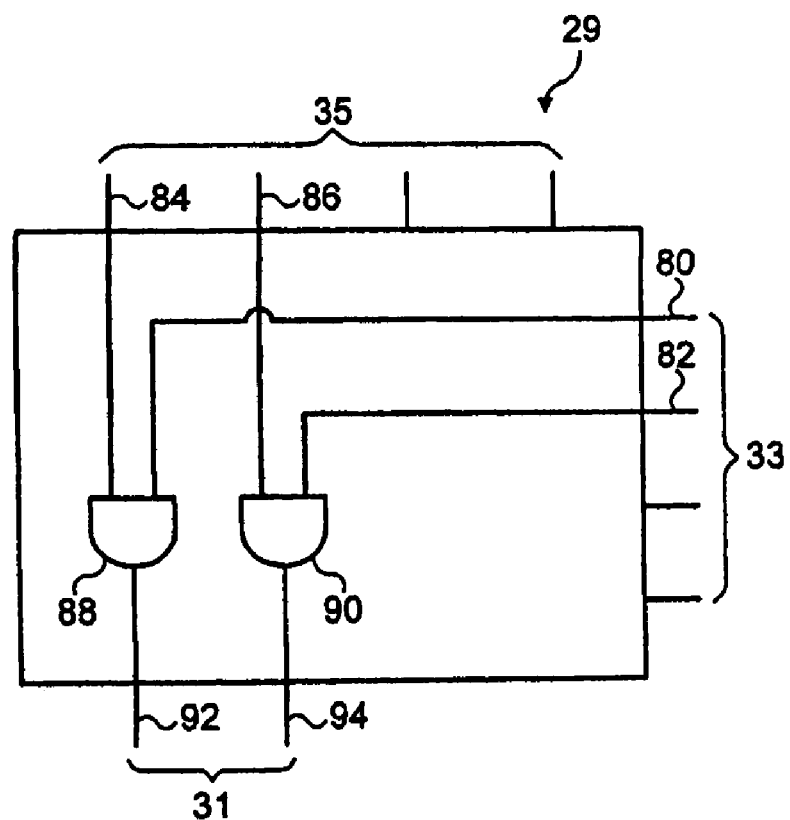
FIG. 4 is a schematic diagram of a portion of the instruction interpreter shown in FIG. 1.

The instruction interpreter 29 includes a logic circuit containing a series of combinatorial components. FIG. 4 is a schematic diagram of a portion of the instruction interpreter shown in FIG. 1. The instruction signal input 33 includes a bit field which includes individual bit signals 80, 82, and rule signal input 35 comprises a bit field which includes individual bit signals 84, 86. The input signals are input into two AND gates 88, 90 such that input signals 80 and 84 are input into AND gate 88, and input signals 82 and 86 are input into AND gate 90. Output control signal 31 comprises a bit field including individual bit signals 92 and 94. Output bit signal 92 corresponds to the output of AND gate 88, and output bit signal 94 corresponds to the output of AND gate 90. Each input and output bit signal may take one of the values 1 or 0 and the output of each AND gate is 1 if both inputs are equal to 1, otherwise the output of the AND gate is 0. If the rule signal input is set such that both bit signals 84 and 86 are set to 1, then the outputs 92 and 94 correspond to the inputs 80 and 82 respectively. In this case, the output signals 92, 94 are controllable by input signals 80, 82. If, however, rule input bit signal 84 is set to 0, then output bit signal 92 is always 0. Setting rule input bit signal 84 to 0 thus prevents instruction input signal 33 from setting output 92. Output 94 remains controllable by input 82. The switching state of the routing component controlled by output bit signal 92 is restricted, even if a hacker intercepts and alters or replaces the instruction signal 33. Similarly, setting rule input bit signal 86 to 0 prevents instruction input signal 33 from setting output 94. It is understood that the configuration of combinatorial components within the instruction interpreter 29 may be much more complicated than the exemplary configuration shown in FIG. 4. For example, the instruction interpreter may contain other logic components arranges so as to generate an control signal output 31 as a logical function of the instruction signal input 33 and rule signal input 35.

The role of the rule selector 37 may now be seen more clearly. The rule selector 37 acts to block or select which instructions 33 input into the instruction interpreter 29 are able to influence the switching state of some or all of the routing components. In this way, pathway configurations that route confidential data to vulnerable data destinations are blocked, whatever instruction 33 is input into the instruction interpreter 29. In this way, even if a hacker is able to feed selected instructions 33 into the instruction interpreter 29, the rule selector 37 ensures that only secure data pathways are allowed according to a set of predefined rules. The set of rules are determined by the precise rule signal 35 generated by the rule selector 37.

In one embodiment, the instruction interpreter 29 further includes timing means to allow more sophisticated sequences of operations to be carried out dynamically. In this case the instruction signal 33 may contain timing information so that several encryption or decryption operations may be carried out in a defined order or at certain times. For example, a routing component may need to be switched during a data transfer. In one embodiment, the instruction signal 33 and rule signal 35 are combined by the instruction interpreter 29 by means of a micro controller instead of, or in addition to, a logic circuit. In this embodiment, the instruction signal 33 or rule signal 35 may be used as an index to a look-up table to retrieve the appropriate pathway configuration and generate an output control signal accordingly. Alternatively, the micro controller may execute an algorithm to determine the appropriate output signals. In one embodiment, the rule selector and instruction interpreter are combined in a single component. In this case, the instruction interpreter does not receive an external rule signal, but instead, the means by which rules are defined are created within the instruction interpreter.

The instruction interpreter 29, rule selector 37, cryptographic circuit 9, key memories 1, 3, 5, 7, 8, CPU 21, and data pathways 23 are all contained on a single monolithic semiconductor integrated circuit 39. This increases the integrity of the system since data cannot easily be intercepted from within the system and components cannot easily be substituted with illegitimate replacements to attempt to circumvent security. Advantageously, the control of the routing components and hence the data flow within the system is controlled by the hardware-based instruction interpreter 29. Unlike software-based controllers in which software can be modified by hackers, hardware is more secure and less prone to tampering. As an additional level of security, the rule selector 37 ensures that even if a hacker is able to infiltrate the system and feed illegitimate instructions into the instruction interpreter 29, these instructions are blocked and security is maintained.

The anti-fuses in the rule selector 37 are configured to generate a rule signal 35 corresponding to those data pathways that are valid for a particular mode of operation of the system. One particular application or mode of operation will allow certain procedures that are illegal in other applications. Initially, the rule selector 37 has the potential to select rules according to a number of applications or rule selection schemes. The anti-fuses are then configured to generate a specific rule signal output 35 and the system becomes tailored permanently to one specific application. In this way, many different systems may be constructed using the same hardware reducing manufacturing and design costs.

In one embodiment, the rules defining allowed procedures may be any of the following:
1. Only use the secret key for decrypting service keys.
2. Use software written keys for memory-to-memory transfers.
3. Only use secure keys for memory transfers.
4. Only use service keys for decrypting control words.
5. Use software written keys for decryption operations.
6. Use a source identification for all data transfers and permit or reject the data transfer according to the identification of the source and the destination.

When an instruction 33 is input into the instruction interpreter 29, the instruction interpreter 29 combines the instruction 33 with the rule signal 35 generated from the rule selector 37. If the instruction is compatible with a chosen rule, for example one or more of the above rules, then the control signal 31 output causes the routing components to switch to the appropriate switching states. If however the instruction interpreter 29 receives an instruction 33 representing an unallowed process, the influence of the rule signal 35 ensures that the instruction 33 is blocked and no output control signals 31 are generated. For example, in the first case above, an instruction 33 to decrypt a service key using a written key would be blocked. In another application, however, this procedure may be allowed and the rule signal 35 would be generated such that this instruction would not be blocked. Rules 2 and 3 above may be used as alternatives to each other. In the last case above, an instruction 33 to perform a data transfer contains information in the data portion 52 of the instruction signal 33 identifying the data source and destination of the transfer. The rule signal ensures that the data transfer is only allowed if the data source and destination are one of an allowed combination as defined by the rule signal 35.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit, comprising:
   a plurality of selectable pathways inter-connected between a plurality of data sources and data destinations;
   a cryptographic circuit connected to the selectable pathways and arranged to selectively receive data at an input from at least one of the data sources, to decrypt or encrypt the data in accordance with a key, and selectively provide the encrypted or decrypted data to at least one of the data destinations via an output;
   an instruction circuit arranged to receive on a first input an instruction signal and to generate therefrom an output to control the plurality of selectable pathways to select a data pathway configuration of the circuit, thereby selecting from which of the data sources the cryptographic circuit receives data and to which destination the cryptographic circuit provides the data;
   wherein the instruction circuit is configurable by a limiting rule signal, received at a second input, to operate in accordance with the rule signal that limits the data pathway configurations that are selectable by the instruction signal, thereby limiting flow of data between the data sources and data destinations.

2. The semiconductor integrated circuit of claim 1 wherein the a rule signal defines those data pathway configurations that are unselectable.

3. The semiconductor integrated circuit of claim 2 wherein the rule signal is chosen from a plurality of rule signals according to a mode of operation of the system.

4. The semiconductor integrated circuit of claim 3 wherein the plurality of rule signals are generated by a rule selector, and wherein the rule selector comprises a plurality of anti-fuses allowing one of a plurality of selectable configurations to be chosen.

5. The semiconductor integrated circuit of claim 4 wherein each of the anti-fuses can be configured once only.

6. The semiconductor integrated circuit of claim 1 wherein the instruction signal is generated by a CPU.

7. The semiconductor integrated circuit of claim 6 wherein the CPU is arranged to generate the instruction signal comprising an instruction portion and a data portion.

8. The semiconductor integrated circuit of claim 1 wherein the instruction signal and rule signal are 32-bit data fields.

9. The semiconductor integrated circuit of claim 1 wherein the plurality of data sources and destinations includes at least one memory for storing encryption or decryption keys.

10. The semiconductor integrated circuit of claim 9 wherein one of the key memories stores at least one key generated by a software algorithm.

11. The semiconductor integrated circuit of claim 9 wherein one of the key memories stores at least one service key for decrypting control words.

12. The semiconductor integrated circuit of claim 9 wherein one of the key memories stores a secret key for decrypting service keys.

13. The semiconductor integrated circuit of claim 1 wherein the key is selected from a plurality of keys in dependence on the instruction signal.

14. The semiconductor integrated circuit of claim 13 wherein the key is selected from one of a plurality of key stores and provided to a key input of the cryptographic circuit in dependence on the instruction signal.

15. The semiconductor integrated circuit of claim 13 wherein the cryptographic circuit has a key input, and the key provided to the key input is selected in accordance with the selected pathway.

16. The semiconductor integrated circuit of claim 15 wherein the plurality of selectable pathways are configurable such that when the data from the data source is a service key, the cryptographic circuit receives a secret key at the key input.

17. The semiconductor integrated circuit of claim 15 wherein the plurality of selectable pathways are configurable such that when the data source is a memory and the data destination is a memory, the cryptographic circuit receives a software written key at the key input.

18. The semiconductor integrated circuit of claim 15 wherein the plurality of selectable pathways are configurable such that when the data source is a plurality of control words, the cryptographic circuit receives a service key at the key input.

19. The semiconductor integrated circuit of claim 15 wherein the plurality of selectable pathways are configurable such that when the data source is broadcast data, the cryptographic circuit receives a software written key at the key input.

20. The semiconductor integrated circuit of claim 1 wherein the circuit is arranged to descramble television broadcast signals using a series of control words.

21. The semiconductor integrated circuit of claim 1 wherein the circuit is arranged to decrypt encrypted control words using a service key.

22. The semiconductor integrated circuit of claim 1 wherein the circuit is arranged to decrypt encrypted service keys using a secret key.

23. The semiconductor integrated circuit of claim 1 wherein the circuit is arranged to perform memory-to-memory transfers.

24. The semiconductor integrated circuit of claim 1 wherein the plurality of data sources and destinations includes at least one of a hard disc, ROM, RAM, data in port and data out port.

25. The semiconductor integrated circuit of claim 1 wherein the cryptographic circuit is an AES circuit.

26. The semiconductor integrated circuit of claim 1 wherein the plurality of selectable pathways are selected by at least one multiplexer or switch.

27. The semiconductor integrated circuit of claim 1 wherein the instruction circuit comprises a plurality of combinatorial components arranged such that the output is generated as a function of the instruction signal.

28. The semiconductor integrated circuit of claim 1 wherein an encryption system is a subscriber-based pay-television system.

29. The semiconductor integrated circuit of claim 1 wherein an encryption system is a monolithic integrated circuit.

* * * * *